US010909264B2

United States Patent
Yamaoka

(10) Patent No.: US 10,909,264 B2
(45) Date of Patent: Feb. 2, 2021

(54) PERSONAL DATA PROVIDING SYSTEM, PERSONAL DATA PROVIDING METHOD, AND INFORMATION PROCESSING APPARATUS

(71) Applicant: FUJITSU LIMITED, Kawasaki (JP)

(72) Inventor: Yuji Yamaoka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 254 days.

(21) Appl. No.: 15/886,430

(22) Filed: Feb. 1, 2018

(65) Prior Publication Data

US 2018/0225479 A1 Aug. 9, 2018

(30) Foreign Application Priority Data

Feb. 9, 2017 (JP) ................................. 2017-021862

(51) Int. Cl.
*G06F 21/62* (2013.01)
*G06F 21/60* (2013.01)
(Continued)

(52) U.S. Cl.
CPC ........ *G06F 21/6245* (2013.01); *G06F 21/602* (2013.01); *G06F 21/6254* (2013.01); *H04L 9/0643* (2013.01); *H04L 63/0421* (2013.01); *H04L 63/0428* (2013.01); *G06F 21/00* (2013.01); *G06Q 30/0201* (2013.01);
(Continued)

(58) Field of Classification Search
CPC .... G06F 21/00; G06F 21/602; G06F 21/6245; G06F 21/6254; G06Q 30/0201; H04L 9/00; H04L 9/0643; H04L 63/00; H04L 63/0421; H04L 63/0428; H04L 63/04; H04L 63/0407; H04W 12/00
See application file for complete search history.

(56) References Cited

U.S. PATENT DOCUMENTS

| 8,935,797 B1* | 1/2015 | Silver | .................... G06Q 20/34 726/26 |
| 2003/0097596 A1* | 5/2003 | Muratov | ............... G06F 21/575 726/26 |

(Continued)

FOREIGN PATENT DOCUMENTS

| JP | 2005-128672 A | 5/2005 |
| JP | 2015-095185 A | 5/2015 |

OTHER PUBLICATIONS

Fujitsu Laboratories Ltd., et al., "Fujitsu Develops World's First Encryption Technology Able to Match Multi-Source Data Encrypted with Different Keys", [online], Feb. 15, 2016, [Search on Dec. 21, 2016] Internet<URL: http://pr.fujitsu.com/jp/news/2016/02/15.html> (Total 4 pages).

*Primary Examiner* — Daniel B Potratz
*Assistant Examiner* — Wansik You
(74) *Attorney, Agent, or Firm* — Fujitsu Patent Center

(57) ABSTRACT

A personal data providing system includes a plurality of first information processing apparatuses. Each of the first information processing apparatuses executes a first process including transmitting an inquiry for an encrypting method of an individual identifier to a terminal of each of individuals, and encrypting each of the individual identifiers into a code based on a response to the inquiry received from the terminal of each of the individuals, and corresponding the code of each of the individuals to personal data of each of the individuals.

7 Claims, 12 Drawing Sheets

(51) Int. Cl.
    *H04L 9/06*      (2006.01)
    *H04L 29/06*     (2006.01)
    *G06Q 30/02*     (2012.01)
    *G06F 21/00*     (2013.01)
    *H04W 12/00*     (2009.01)
    *H04L 9/00*      (2006.01)

(52) U.S. Cl.
    CPC ............... *H04L 9/00* (2013.01); *H04L 63/00* (2013.01); *H04L 63/04* (2013.01); *H04L 63/0407* (2013.01); *H04W 12/00* (2013.01)

(56) References Cited

U.S. PATENT DOCUMENTS

| | | | |
|---|---|---|---|
| 2014/0108258 A1* | 4/2014 | Williams | G06Q 30/02 705/51 |
| 2016/0147945 A1* | 5/2016 | MacCarthy | G06F 21/6254 705/51 |

* cited by examiner

FIG. 1

| E-MAIL ADDRESS | PURCHASE DATE | COMMODITY ID |
|---|---|---|
| X@example.com | 20151110 | FOODSTUFF 1 |
| X@example.com | 20151120 | FOODSTUFF 2 |
| X@example.com | 20151130 | FOODSTUFF 2 |
| Y@example.com | 20151103 | FOODSTUFF 2 |
| ⋮ | ⋮ | ⋮ |

FIG. 2A

| USER NUMBER | E-MAIL ADDRESS | ... |
|---|---|---|
| 1 | X@example.com | ... |
| 2 | Z@example.com | ... |
| ⋮ | ⋮ | ⋮ |

FIG. 2B

| USER NUMBER | MEASUREMENT DATE | WEIGHT |
|---|---|---|
| 1 | 20151105 | 78 |
| 1 | 20151115 | 79 |
| 1 | 20151125 | 70 |
| 1 | 20151205 | 68 |
| 2 | 20151105 | 50 |
| ⋮ | ⋮ | ⋮ |

FIG. 8

REGARDING THIRD PARTY DISCLOSURE OF PURCHASE HISTORY

IF YOU AGREE TO PROVIDE THIRD PARTY PURCHASE HISTORY OF YOUR CUSTOMER, WE WILL GIVE YOU 10 POINTS OF SHOPPING POINTS EVERY TIME WE PROVIDE CUSTOMER'S DATA TO EACH THIRD PARTY ORGANIZATION THAT WISHES TO ACQUIRE DATA. IN THIS CASE, PLEASE NOTE THAT WE CAN NOT GUARANTEE DATA DELETION OR THE LIKE FROM THIRD PARTY.

☑ I AGREE TO DISCLOSE PURCHASE HISTORY TO THIRD PARTY
(GET 10 POINTS EVERY TIME IT IS PROVIDED)

REGARDING LINKING BY E-MAIL ADDRESS

DISCLOSING PURCHASE HISTORY TO THIRD PARTY IN FORM THAT ALLOWS PURCHASE HISTORY TO BE LINKED TO E-MAIL ADDRESS MAKES IT EASILY INCREASE DEMAND FROM THIRD PARTIES. THEREFORE, THERE IS MERIT THAT SHOPPING POINTS ARE EASIER TO BE GRANTED IF THEY ARE LINKED. EVEN IF IT IS LINKED, SINCE E-MAIL ADDRESS IS PROVIDED ONLY TO SPECIFIC DATA BROKER AND IS ENCRYPTED AND PROVIDED, MANY THIRD PARTIES CAN NOT IMMEDIATELY LINK PURCHASE HISTORY AND E-MAIL ADDRESS. HOWEVER, AS THIRD PARTY, DATA BROKER WILL BE ABLE TO LINK PURCHASE HISTORY WITH E-MAIL ADDRESS BY RECEIVING LINKED DATA. IN ADDITION, KEEP IN MIND THAT IT WILL BE EASIER TO IDENTIFY CUSTOMERS, BECAUSE AMOUNT OF INFORMATION INCREASES BY LINKING TO OTHER DATA SO AS TO BE LINKED.

- ⦿ E-MAIL ADDRESS IS NOT PROVIDED AND NOT LINKED
- ○ ENCRYPTED E-MAIL ADDRESS IS PROVIDED ONLY TO DATA BROKERS AND LINKED

PLEASE SET PASSWORD FOR ENCRYPTION. IF OTHER COMPANIES ALSO AGREE TO DISCLOSE TO THIRD PARTY LINKED BY SETTING THE SAME PASSWORD WITH THE SAME E-MAIL ADDRESS, THIRD PARTY WILL BE ABLE TO LINK BOTH TWO DATA (CUSTOMER DATA AT OUR COMPANY AND CUSTOMER DATA AT OTHER COMPANIES)

PASSWORD: [      ]

- ○ ENCRYPTED E-MAIL ADDRESS IS PROVIDED ONLY TO DATA BROKER AND LINKED

THIRD PARTIES WILL BE ABLE TO LINK BOTH DATA (CUSTOMER DATA AT OUR COMPANY AND CUSTOMER DATA AT OTHER COMPANIES) IF OTHER COMPANIES ALSO AGREE TO DISCLOSE TO THIRD PARTY LINKED WITH THE SAME E-MAIL ADDRESS

[ SETTING ] ~ 81

FIG. 10

| PERSONAL ID | METHOD | PASSWORD | CODE |
|---|---|---|---|
| X@example.com | h | X-secret | 1A44 |
| Y@example.com | h | | 2B78 |
| Z@example.com | | | |

FIG. 11

| PERSONAL ID | METHOD | PASSWORD | CODE |
|---|---|---|---|
| X@example.com | h | X-secret | 1A44 |
| Y@example.com | h | Y-secret | 4DB2 |

FIG. 12

| PERSONAL ID | METHOD | PASSWORD | CODE | DATA ID |
|---|---|---|---|---|
| X@example.com | h | X-secret | 1A44 | d1 |
| X@example.com | h | X-secret | 1A44 | d2 |
| ⋮ | ⋮ | ⋮ | ⋮ | ⋮ |

FIG. 13

| BUSINESS ENTITY ID | CODE |
|---|---|
| 3a | 1A44 |
| 3a | 2B78 |
| 3b | 1A44 |
| 3b | 4DB2 |

FIG. 14

| BUSINESS ENTITY ID | BUSINESS ENTITY ID | CODE |
|---|---|---|
| 3a | 3b | 1A44 |

FIG. 15A

| BUYER ID | APPLICATION ID |
|---|---|
| 5a@example.com | a1 |

FIG. 15B

| APPLICATION ID | BUSINESS ENTITY ID |
|---|---|
| a1 | 3a |
| a1 | 3b |

FIG. 16

| BUYER ID | CODE | TEMPORARY ID |
|---|---|---|
| 5a@example.com | 1A44 | k1 |

FIG. 17

| BUYER ID | CODE | TEMPORARY ID | DATA ID |
|---|---|---|---|
| 5a@example.com | 1A44 | k1 | d1 |

FIG. 19

| TEMPORARY ID | PURCHASE DATE | COMMODITY ID |
|---|---|---|
| k1 | 20151110 | FOODSTUFF 1 |
| k1 | 20151120 | FOODSTUFF 2 |
| k1 | 20151130 | FOODSTUFF 2 |

FIG. 20

| TEMPORARY ID | PURCHASE DATE | WEIGHT |
|---|---|---|
| k1 | 20151105 | 78 |
| k1 | 20151115 | 79 |
| k1 | 20151125 | 70 |
| k1 | 20151205 | 68 |

PERSONAL DATA PROVIDING SYSTEM, PERSONAL DATA PROVIDING METHOD, AND INFORMATION PROCESSING APPARATUS

CROSS-REFERENCE TO RELATED APPLICATION

This application is based upon and claims the benefit of priority of the prior Japanese Patent Application No. 2017-21862, filed on Feb. 9, 2017, the entire contents of which are incorporated herein by reference.

FIELD

The embodiments discussed herein are related to a personal data management technology.

BACKGROUND

Due to the development of a big data related technology or the like, there is an increasing number of people who want to analyze a large number of personal data for market analysis and the like. In addition, in order to gather the personal data to be used for the analysis, there is an increasing demand for purchasing the personal data from businesses entity holding the personal data. Furthermore, to meet the demand, there are an increasing number of individuals who want to sell the personal data and the business entity which holds the personal data.

In FIG. 1 an example of the personal data held by the business entity is illustrated. For example, the business entity runs an online food store, and a buyer who purchases a food stuff is an individual. In an example of FIG. 1, an e-mail address of the individual, information of a date on which the individual purchases the commodity and an ID (IDentifier) of the commodity are included in the personal data.

In FIGS. 2A and 2B, examples of the personal data held by other business entities are illustrated. For example, the business entity runs a health management cloud service, and the service is provided to the individual. As described in FIG. 2A, a user number (unique number assigned to each of individuals) and the e-mail address of the individual as the personal data are managed. In addition, as described in FIG. 2B, the user number, weight, and a measurement date of the weight are managed as the personal data. As examples of FIGS. 2A and 2B, information such as the e-mail address of the individual and the weight may be managed in a separate table, and both may be linked by the user number assigned to each of the individuals.

If information with which the individual can be specified is included in each of the personal data, a person who acquires the personal data from a plurality of business entities can perform analysis (for example, relationship between purchased commodities and weight) which may not be performed with only the personal data acquired from one business entity. In the above-described example, the e-mail address corresponds to information with which the individual can be specified. However, from the viewpoint of privacy protection, the individual may not desire to provide information with which the individual can be specified to a third party. In the related art, the privacy protection according to individual wishes may not be sufficient.

Examples of related art are Japanese Laid-open Patent Publication No. 2005-128672, and Fujitsu Laboratories Ltd., et al, "Fujitsu Develops World's First Encryption Technology Able to Match Multi-Source Data Encrypted with Different Keys", submitted within the Information Disclosure Statement filed Feb. 1, 2018.

An object of the embodiment is to provide a technology for realizing privacy protection according to individual wishes in one aspect.

SUMMARY

According to an aspect of the invention, a personal data providing system includes a plurality of first information processing apparatuses, wherein each of the first information processing apparatuses executes a first process including: transmitting an inquiry for an encrypting method of an individual identifier to a terminal of each of individuals, and encrypting each of the individual identifiers into a code based on a response to the inquiry received from the terminal of each of the individuals, and corresponding the code of each of the individuals to personal data of each of the individuals.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram illustrating an example of personal data;

FIGS. 2A and 2B are diagrams illustrating examples of the personal data;

FIG. 8 is a diagram illustrating an example of an encryption setting screen;

FIG. 10 is a diagram illustrating an example of data stored in a business entity data storage unit;

FIG. 11 is a diagram illustrating another example of the data stored in the business entity data storage unit;

FIG. 12 is a diagram illustrating still another example of the data stored in the business entity data storage unit;

FIG. 13 is a diagram illustrating an example of the data stored in a broker data storage unit;

FIG. 14 is a diagram illustrating another example of the data stored in the broker data storage unit;

FIGS. 15A and 15B are diagrams illustrating examples of purchase application data stored in the broker data storage unit;

FIG. 16 is a diagram illustrating still another example of the data stored in the broker data storage unit;

FIG. 17 is a diagram illustrating still another example of the data stored in the broker data storage unit;

FIG. 19 is a diagram illustrating an example of data transmitted from the business entity device to a buyer device;

FIG. 20 is a diagram illustrating another example of the data transmitted from the business entity device to the buyer device.

DESCRIPTION OF EMBODIMENTS

Figure 3:
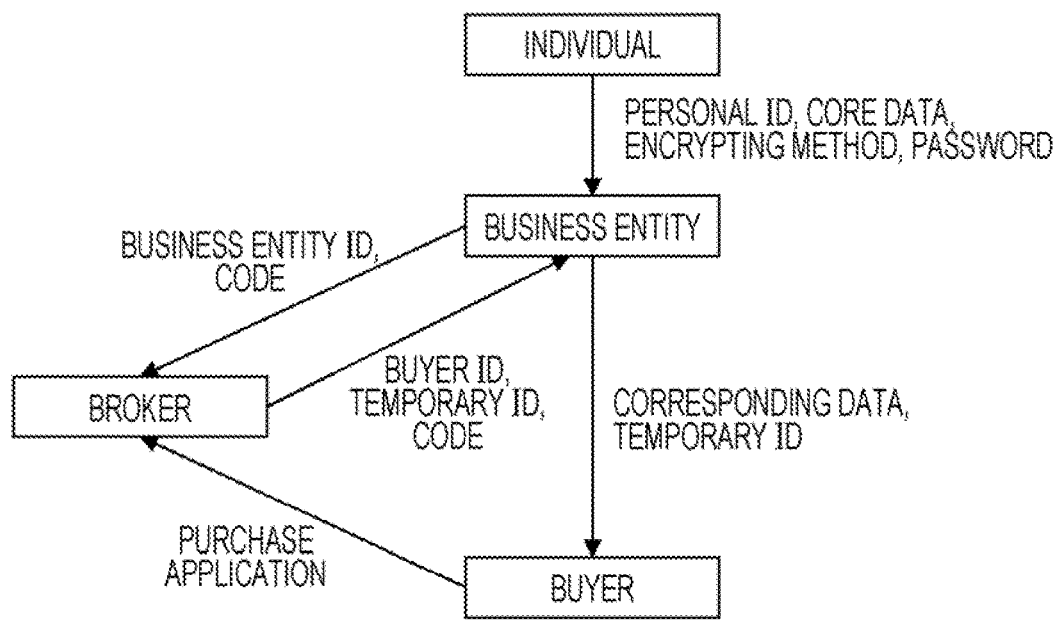
FIG. 3 is a diagram for explaining an outline of an embodiment.

By using FIG. 3, an outline of an embodiment will be described. A business entity that provides a service to an individual or the like provides the individual with a function for designating at least one of an encrypting method and a password with respect to the individual who agrees to provide the personal data to a third party under a condition that anonymity of a personal ID is secured. Then, the business entity provides the personal ID encrypted according to at least one of the encrypting method and the password designated by the function and the business entity ID to the broker of the personal data.

Here, it is assumed that the personal ID is information capable of specifying the individual. For example, the e-mail address, combination of a name and an address, an individual number, and the like correspond to the individual ID. In the following description, an example in which the e-mail address is used as the personal ID is described, but it is assumed that each of the individuals uses one different e-mail address. In addition, a part other than the personal ID in the personal data is referred to as the core data, The broker acquires the encrypted personal ID (hereinafter, referred to as code) from a plurality of business entities, and specifies the code generated from the same personal ID and acquired from the plurality of business entities. Then, in a case where purchase application for designating the plurality of business entities is received, the broker assigns a common code in the plurality of business entities, and transmits the temporary ID, the buyer ID, and the code to the plurality of business entities.

The business entity links the held personal data with the temporary ID, and transmits the part (that is, core data) other than the personal ID and the temporary ID in the personal data to a buyer.

The buyer receives the core data and the temporary ID from the plurality of business entities, and links between the pieces of the core data to which the same temporary ID is assigned.

According to such a method, the individual does not provide the personal ID to the broker and the buyer who are the third party. That is, the anonymity of the personal ID is secured. Meanwhile, since the buyer does not want to specify the individual and wants to analyze property with respect to a set of the individual, there is no problem even in a case of such a data provision method.

In addition, since data is easily copied, when data leaks due to contract violation or leak accident occur at a destination, the value of the data will be impaired. Therefore, it is preferable to avoid unwanted data provision as much as possible, but in the method illustrated in FIG. 3, the business entity does not provide the core data to a person (for example, broker) other than the buyer.

In addition, even the core data with high anonymity by itself, if it is linked with enormous types and amounts of data, the anonymity may decrease. Therefore, it is preferable to be able to designate whether or not to link with other data according to the secrecy of the data or the like, but it is also possible to allow individuals to do such designation.

In the following description, the embodiment will be described in detail.

Figure 4:
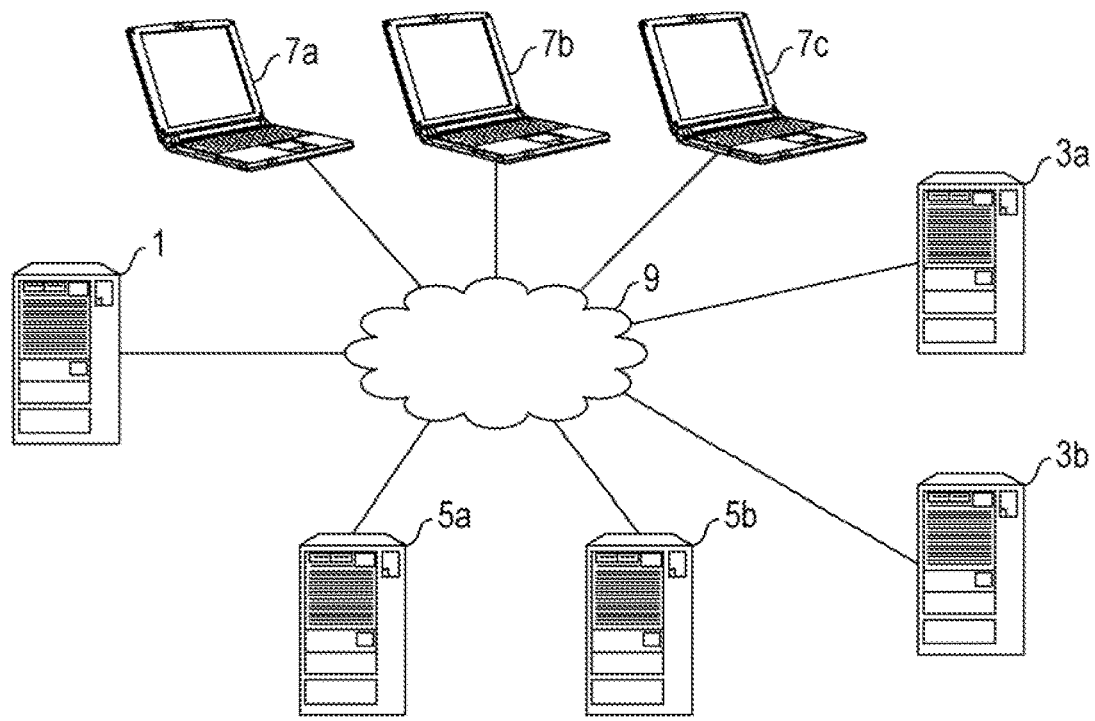
FIG. 4 is a diagram illustrating an outline of a system of the embodiment.

FIG. 4 illustrates an outline of a system of the embodiment. For example, the user devices 7a to 7c are an individual computer, a smart device, or the like, and connected to the network 9 that is the Internet by wired or wireless connection. The user devices 7a to 7c receive providing of a service provided by the business entity device 3a and 3b through the network 9. The business entity devices 3a and 3b hold the personal data (for example, including personal ID and core data) of the individual using the user devices 7a to 7c. A broker device 1 mediates a process of selling the personal data of the business entity devices 3a and 3b with respect to the buyer devices 5a and 5b. The buyer devices 5a and 5b purchase the personal data held by the business entity devices 3a and 3b. The personal ID is not provided to the buyer devices 5a and 5b in which the personal data is purchased.

In FIG. 4, the number of the user device is three, the number of the broker device is one, the number of the business entity device is two, and the number of the buyer device is two, but the numbers are not limited thereto.

Figure 5:
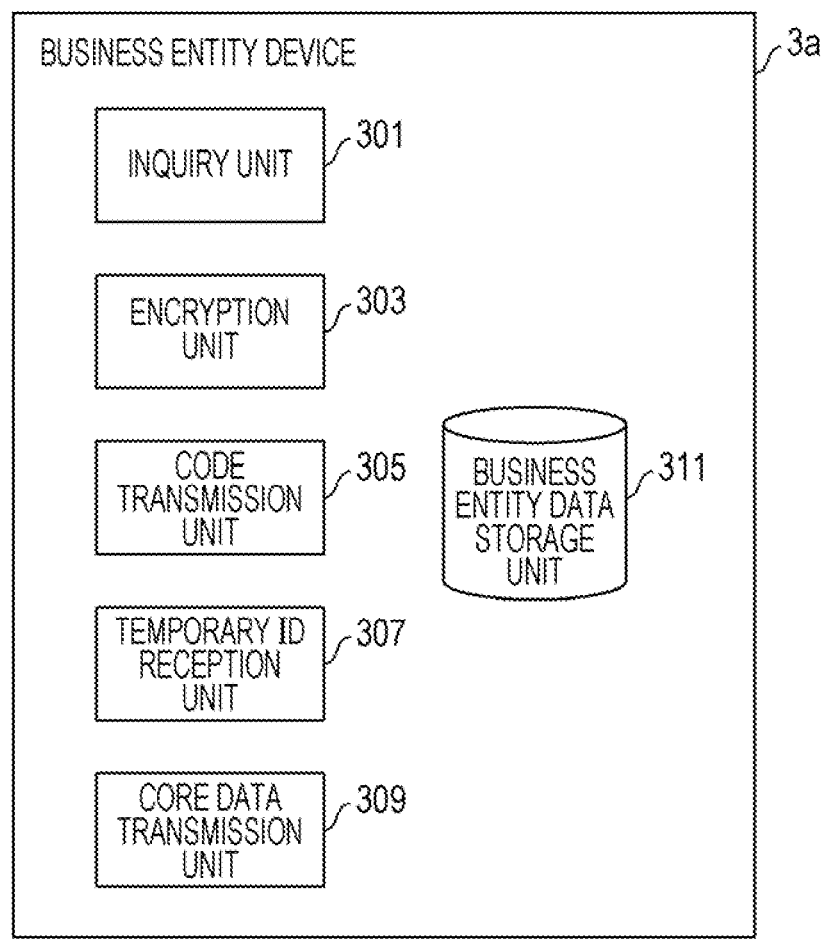
FIG. 5 is a functional block diagram of a business entity device.

In FIG. 5, a functional block diagram of the business entity device 3a is illustrated. The business entity device 3a includes an inquiry unit 301, an encryption unit 303, a code transmission unit 305, a temporary ID reception unit 307, a core data transmission unit 309, and a business entity data storage unit 311. Here, a functional block diagram of the business entity device 3a is illustrated, but a functional block configuration of the business entity device 3b is the same as a functional block configuration of the business entity device 3a.

The inquiry unit 301 transmits an inquiry for the encrypting method of the personal ID and the password to the user devices 7a to 7c. The encryption unit 303 generates a code by encrypting the personal ID based on a response to the inquiry received from the user devices 7a to 7c. The code transmission unit 305 transmits the generated code (and in some cases, information on encrypting method) to the broker device 1. The temporary ID reception unit 307 receives the temporary ID from the broker device 1. The core data transmission unit 309 associates the temporary ID with the core data stored in the business entity data storage unit 311, and transmits the core data with which the temporary ID is associated to the buyer devices 5a and 5b. Various types of data managed by the business entity device 3a are stored in the business entity data storage unit 311.

Figure 6:
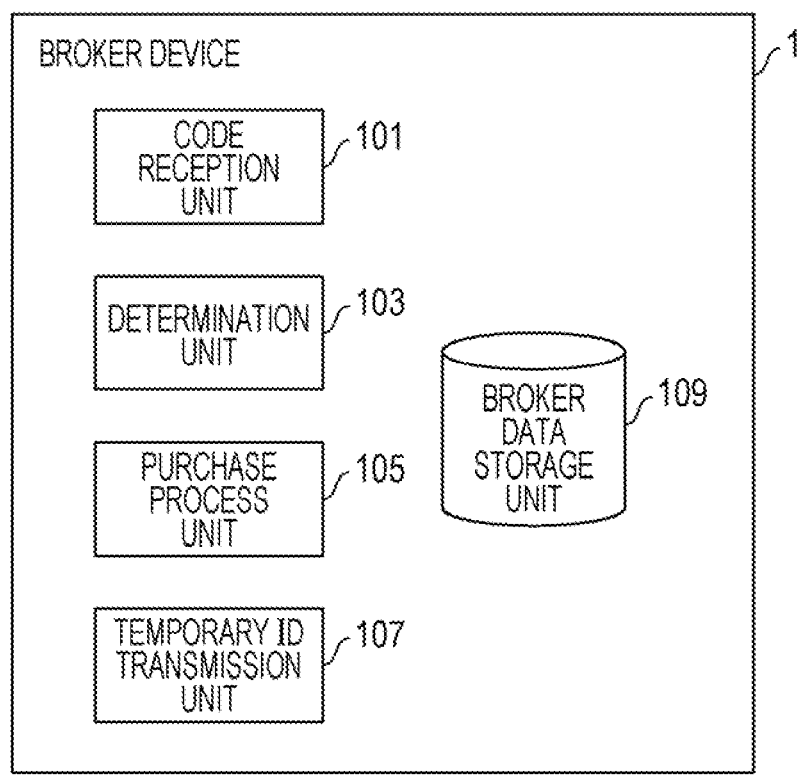
FIG. 6 is a functional block diagram of a broker device.

In FIG. 6, a functional block diagram of the broker device 1 is illustrated. The broker device 1 includes a code reception unit 101, a determination unit 103, a purchase process unit 105, a temporary ID transmission unit 107, and a broker data storage unit 109.

The code reception unit 101 receives the code (and in some cases, information on encrypting method) from the business entity devices 3a and 3b, and stores the received code in the broker data storage unit 109. The determination unit 103 specifies the code generated from the same personal ID or received from a plurality of the business entity devices based on data stored in the broker data storage unit 109, and assigns the same temporary ID for the specified code. The purchase process unit 105 processes purchase application data received from the buyer devices 5a and 5b. The temporary ID transmission unit 107 transmits the temporary ID corresponding to the code generated in the business entity device to the business entity device of the business entity designated in the purchase application data. However, for the code to which the temporary ID is not assigned, the temporary ID is not transmitted. The various types of data managed by the broker device 1 are stored in the broker data storage unit 109.

Next, by using FIG. 7 to FIG. 20, a process performed in a system of the embodiment will be described by using processes performed by the business entity device 3a, the user device 7a, the broker device 1, and the buyer device 5a, as an example.

Figure 7:
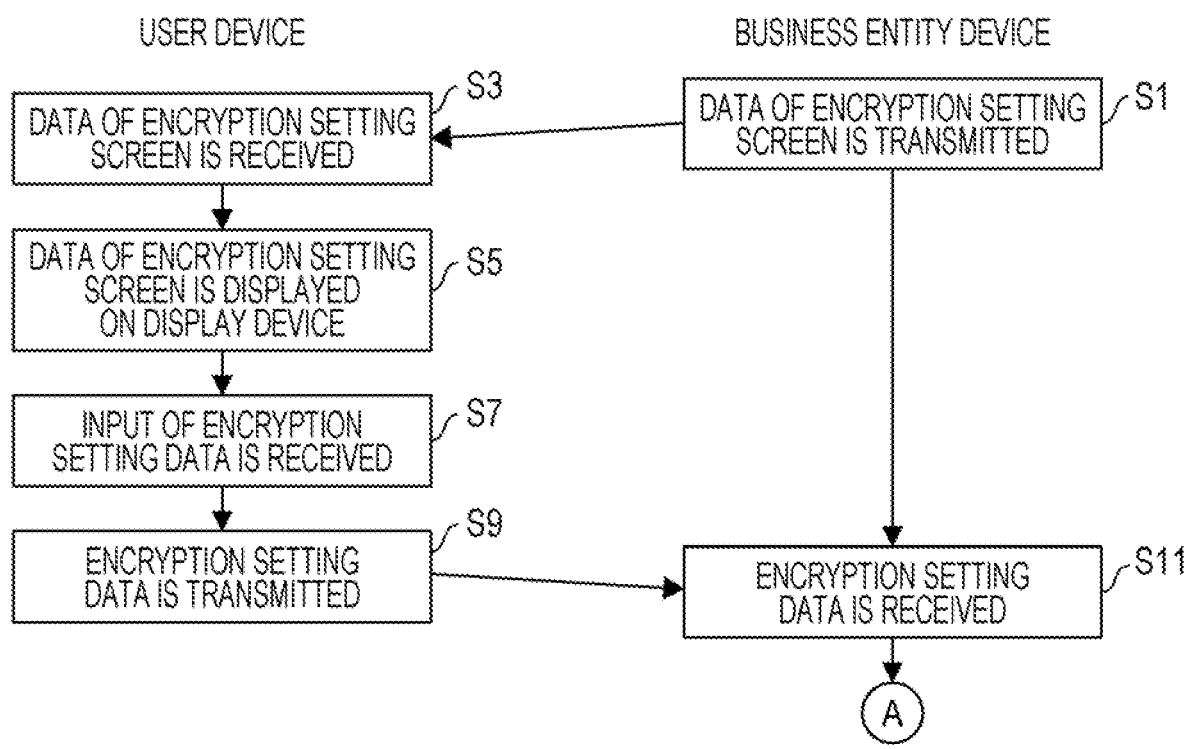
FIG. 7 is a diagram illustrating a process flow.

First, the inquiry unit 301 of the business entity device 3a reads data of an encryption setting screen from the business entity data storage unit 311, and transmits the read data of the encryption setting screen to the user device 7a (FIG. 7; step S1). The encryption setting screen is a screen for performing the inquiry with respect to at least one of the encrypting method of the personal ID and the password used in encryption.

The user device 7a receives the data of the encryption setting screen from the business entity device 3a (step S3), and displays the data of the encryption setting screen on a display device (step S5).

In FIG. 8, an example of the encryption setting screen is illustrated. In an example of FIG. 8, a display for confirming that the purchase history is provided to the third party and a display for conforming linking using the e-mail address that is the personal ID used. Regarding the linking, it is possible to select either linking using the code generated by using the password or linking using the code generated without using the password. As described in FIG. 8, since agreement for providing the core data and the encrypted personal ID to the third party is confirmed, the individual easily grasps that provision of the core data is requested, and since a psychological barrier on the agreement decreases, the business entity easily acquires the agreement. Furthermore, since it is notified the individual that a part of sales of the core data is returned according to the degree of contribution, incentives for providing demanded core data to the third party are working such that the business entity easily acquires the agreement.

For example, when the individual operating the user device 7a performs selection of a checkbox and a radio button and a setting button 81 in FIG. 8 is pressed by mouse click or the like, the user device 7a receives encryption setting data (step S7). Authentication of the individual is performed separately by any method such as login.

The user device 7a transmits the input encryption setting data to the business entity device 3a (step S9). The encryption setting data includes at least one of designation of the encrypting method and the password, information on the agreement of the provision of the third party of the core data, the personal ID of the individual operating the user device 7a, or the like.

In response to this, the encryption unit 303 of the business entity device 3a receives the encryption setting data from the user device 7a (step S11). The process proceeds to step S13 of FIG. 9 through a terminal A.

Figure 9:
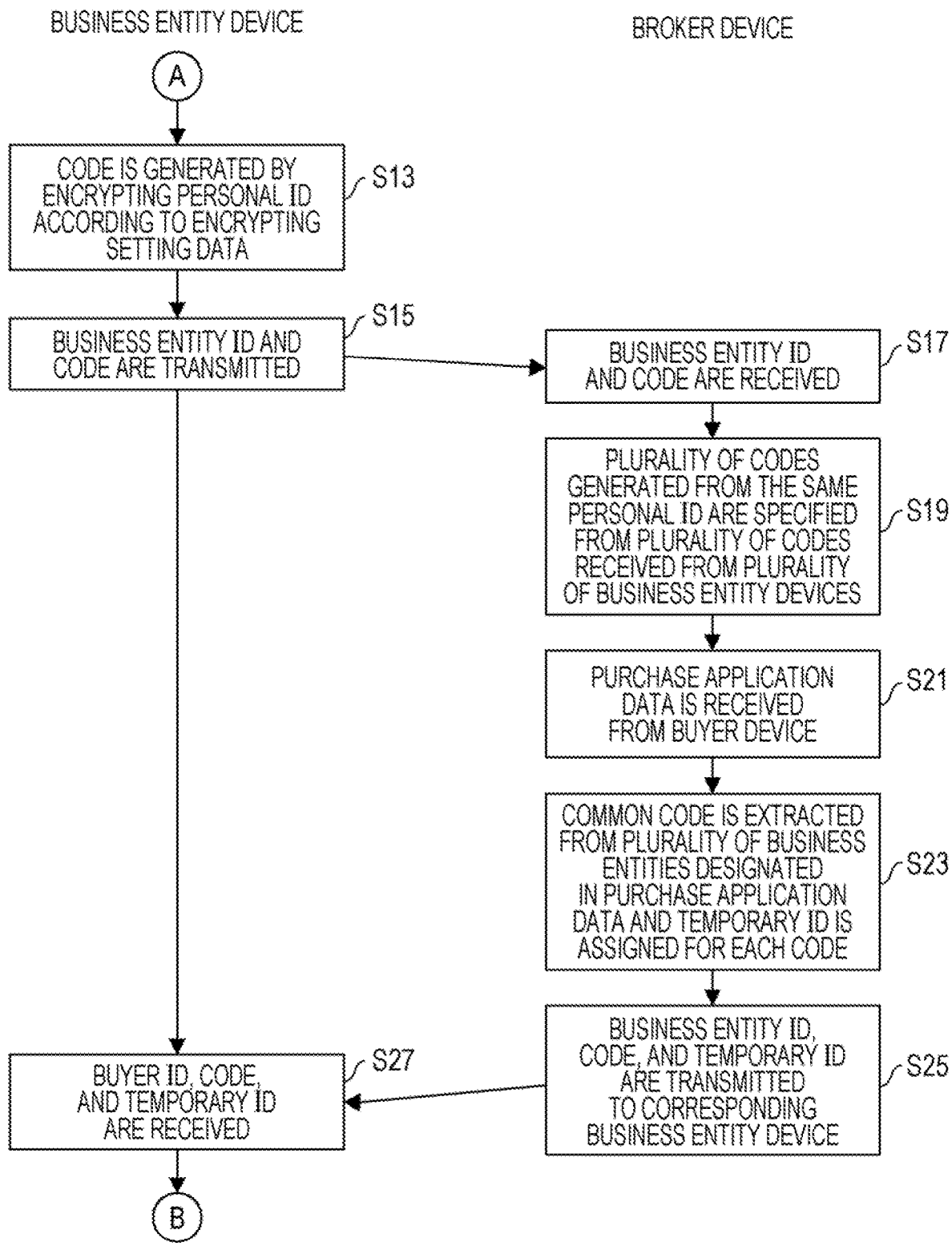
FIG. 9 is a diagram illustrating a process flow.

Proceeding to description of FIG. 9, the encryption unit 303 generates a code by encrypting the personal ID included in the encryption setting data according to the received encryption setting data (FIG. 9: step S13). Then, the encryption unit 303 stores the generated code in the business entity data storage unit 311.

For example, in a case where the password is not used, a result of applying a byte sequence obtained by decrypting the personal ID as American Standard Code for Information Interchange (ASCII) to cryptographic hash function secure hash algorithm (SHA)-256-bit is processed as the code. For example, in a case where the password is used, a result of applying the byte string obtained by decrypting an ASCII character (such as colon if personal ID is mail address) not included in the personal ID is appended at the end of the personal ID, and then a result of applying the byte string obtained by decrypting a character string to which the password of ASCII is appended as ASCII to the cryptographic hash function processed as the code. The reason for using the ASCII character not included in the personal ID is to reduce the possibility that the same character string with different combination of the personal ID and the password is generated.

If the cryptographic hash function is used, since it is hard to specify the original personal ID from the code, it is hard to specify the individual in a destination of the code (in embodiment, broker device 1). In addition, since the codes coincide in only a case of the same personal ID and password, it is possible to determine the identity with the code as it is at the destination of the code.

However, the encrypting method may be a method other than the cryptographic hash function. In addition, even in the password, other information may be used as long as it is the key to the secret of the individual. Normally, since it is hard to perform linking of the core data in a case where the encrypting method is different between the business entities, it is hard to perform the linking between the business entities with different encrypting method in a case where each business entity adopts only one encrypting method. Accordingly, the business entity may generate a plurality of codes by using a plurality of encrypting methods. For example, a code in a case where SHA-256 is used and a code in a case where SHA-512 is used may be generated.

In FIG. 10, data stored in the business entity data storage unit 311 of the business entity device (here, referred to as business entity device 3a) is illustrated by a process of step S13 as an example. In the example of FIG. 10, the e-mail address that is the personal ID, information of the encrypting method, the password, and the code are stored. For example, a first record indicates that the individual of which the personal ID is "X@example.com" agrees to provide the personal ID and the code generated by the encryption of a method "h" using a password "X-secret" is "1A44". Similarly, a second record indicates that the individual of which the personal ID is "Y@example.com" agrees to provide the personal ID and the code is generated without using the password is "2B78". A third record indicates that the individual of whom the personal ID is "Z@example.com" does not agree to provide the individual ID. An actual code is configured with more characters, but in order to simplify the explanation, a code formed of four characters is used as an example in the embodiment.

In FIG. 11, an example of data stored in the business entity data storage unit 311 of another business entity device (here, referred to as business entity device 3b) is illustrated. In the example of FIG. 11, the e-mail address that is the personal ID, information of the encrypting method, the password, and the code are stored. The first record indicates that the individual of which the personal ID is "X@example.com" agrees to provide the personal ID and the code generated by the encryption of the method "h" using a password "X-secret" is "1A44". The second record indicates that the individual of which the personal ID is "Y@example.com" agrees to provide the personal ID and the code generated by using the password "Y-secret" without using the password is "4DB2".

As can be seen by comparing FIG. 10 and FIG. 11, the individuals of which the personal ID is "X@example.com" have the same settings between both business entities.

Meanwhile, the individuals of which the personal ID is "Y@example.com" have different settings between both business entities. The individuals of which the personal ID is "Z@example.com" does not agree to provide the personal data which is not used in the service of the business entity of the business entity device 3b or held by the business entity of the business entity device 3b to the third party.

In the embodiment, by linking between pieces of the core data, it is possible for the individual himself/herself to control that the pieces of the core data of the business entity are linked with each other.

The encryption setting data different for each type of core data may be used in each of the business entities. For example, in a case where the business entity also manages an exercise history in addition to a weight history as the core data, the encryption setting data as exemplified above with respect to each core data may be handled. In this case, for example, data as illustrated in FIG. 12 is stored in the business entity data storage unit 311, and data for managing a correspondence relationship between a data ID and the core data is separately stored.

Returning to the description of FIG. 9, the code transmission unit 305 transmits the business entity ID, and the code generated in the business entity to the broker device 1 (step S15). For example, in a case of the code illustrated in FIG. 10, the code transmission unit 305 of the business entity device 3a transmits information indicating that it is the business entity device 3a and [1A44 and 2B78]. In addition, for example, in a case of the code illustrated in FIG. 11, the code transmission unit 305 of the business entity device 3b transmits information indicating that it is the business entity device 3b and [1A44 and 4DB2].

In step S15, the information of the encrypting method may further be transmitted. For example, when a method without the password is "h" and a method with the password is "$h_k$", in a case of an example of FIG. 10, the code transmission unit 305 of the business entity device 3a transmits the information indicating that it is the business entity device 3a and [h: [2B78] and $h_k$: [1A44]]. In addition, in a case of an example of FIG. 11, the code transmission unit 305 of the business entity device 3b transmits the information indicating that it is the business entity device 3b and [$h_k$: [1A44 and 4DB2]]. Normally, since it is hard to determine identity by comparing the codes generated by different encrypting method, in a case where it is assumed that the identity between the codes generated by different encrypting method is determined, the information of the encrypting method may be used. However, in a case where different encrypting method is used and it is determined in advance that the codes are not identical, it is not demanded to transmit the information on the encrypting method.

Even if the personal ID is the same and the encrypting method is the same, different code may be generated by the encrypting method. Even in such a case, for example, if the technology disclosed in Non-Patent Document 1 is used, it is possible to determine whether or not the personal ID is the same.

Returning to the description of FIG. 9, the code reception unit 101 of the broker device 1 receives the business entity ID and the code of the business entity device 3a from the business entity device 3a (step S17). The code reception unit 101 stores the received business entity ID and code in the broker data storage unit 109.

In FIG. 13, an example in which data stored in the broker data storage unit 109 after a process of step S17 is illustrated. In the example of FIG. 13, the business entity ID and the code received from the business entity device of the business entity having the business entity ID are stored.

The determination unit 103 specifies the code generated from the same personal ID and received from the plurality of the business entity devices from the broker data storage unit 109 (step S19). For example, in a case where data illustrated in FIG. 13 is stored in the broker data storage unit 109, the code "1A44" corresponding to the business entity ID "3a" and the code "1A44" corresponding to the business entity ID "3b" are specified. In addition, the determination unit 103 stores data illustrated in FIG. 14 in the broker data storage unit 109. In an example of FIG. 14, a result obtained by corresponding the business entity ID and the code of the business entity device to which the code specified in step S19 is transmitted is stored.

Meanwhile, the purchase process unit 105 receives the purchase application data from the buyer device 5a (step S21). Then, the purchase process unit 105 stores the received purchase application data in the broker data storage unit 109.

In FIGS. 15A and 15B, an example of the purchase application data stored in the broker data storage unit 109 is illustrated. For example, in the purchase application data, data as illustrated in FIG. 15A and data as illustrated in FIG. 158 are included. In data as illustrated in FIG. 15A, the buyer ID and an application ID are included. In the data illustrated in FIG. 15B, the application ID and the business entity ID are included. However, the application ID may be assigned by the broker device 1, and in this case, data obtained by associating the business entity ID with the buyer ID is transmitted from the buyer device 5a.

The temporary ID transmission unit 107 extracts a common code between the plurality of the designated business entities in the purchase application data stored in the broker data storage unit 109, the temporary ID is assigned in each of the extracted codes (step S23). Then, the temporary ID transmission unit 107 stores the buyer ID, the code, and the temporary ID of the buyer device 5a that transmits the purchase application data in the broker data storage unit 109. For example, as the temporary ID, a serial number or a random number is used. Conditions satisfied by assignment of the temporary ID may be satisfied are (1) a condition that a value unrelated directly to the code is assigned, (2) a condition that the same value is assigned to the same code for certain purchase application data, and (3) a condition that values that are directly irrelevant to each other are assigned to different purchase application data.

In FIG. 16, an example of data stored in the broker data storage unit 109 after step S23 is illustrated. In an example of FIG. 16, the buyer ID, the code, and the temporary ID are stored. In a case where the data ID corresponding to the type of the core data is set, for example, data as illustrated in FIG. 17 is stored.

The temporary ID transmission unit 107 transmits the buyer ID, the code, and the temporary ID stored in the broker data storage unit 109 to the business entity device of the business entity (here, it is assumed as business entity devices 3a and 3b) designated in the purchase application data (step S25).

In response to this, the temporary ID reception unit 307 of the business entity device 3a receives the buyer ID, the code, and the temporary ID from the broker device 1 (step S27). The temporary ID reception unit 307 stores the buyer ID, the code, and the temporary ID in the business entity data storage unit 311. Authentication on data from the broker device 1 is performed separately by an arbitrary method such as an electronic signature. Then, the process proceeds to step S29 of FIG. 18 through a terminal B.

Figure 18:
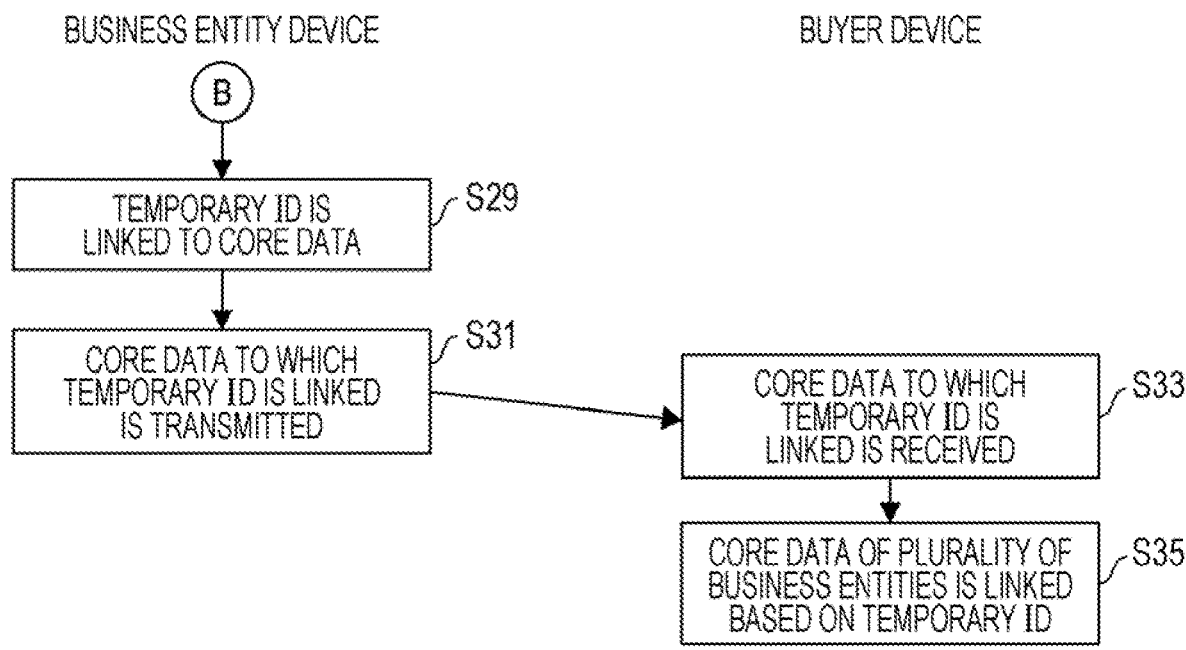
FIG. 18 is a diagram illustrating a process flow.

Returning to the description of FIG. 18, the core data transmission unit 309 of the business entity device 3*a* links the temporary ID with the core data managed in the business entity data storage unit 311 by the business entity device 3*a* (FIG. 18: step S29). More specifically, the core data transmission unit 309 specifies a code coinciding with the code received in step S27, and replaces the personal ID corresponding to the specified code with a corresponding temporary ID received in step S27.

The core data transmission unit 309 transmits the core data to which the temporary ID is linked to the buyer device (here, buyer device 5*a*) including the buyer ID received in step S27 by, for example, e-mail (step S31)

In FIG. 19, an example of data transmitted by a process of step S31 is illustrated. In an example of FIG. 19, the temporary ID, and information of a purchase date and a commodity ID that are the core data are transmitted.

In addition, in FIG. 20, an example of data transmitted from another business entity device (here, business entity device 3*b*) is illustrated. In an example of FIG. 20, the temporary ID, and information of the measurement date and information of the weight that are the core data are transmitted.

The buyer device 5*a* receives the core data to which the temporary ID is linked from the business entity device 3*a* (step S33).

Then, the buyer device 5*a* links the core data received from the plurality of business entities based on the temporary ID (step S35). Specifically, the buyer device 5*a* links the pieces of the core data to which the same temporary ID is linked.

According to the method of the embodiment described above, since the individual and the business entity can safely sell the core data linked to other core data, data trading becomes active.

Since linking (that is, linking in state where personal ID is concealed) with the anonymity of the individual is realized, it is possible to safely agree the provision to the third party. In addition, without providing the personal ID to the buyer (even in concealed state), since the personal ID is provided in a state where it is also encrypted for the broker and not linked with other core data, it is possible to increase the anonymity.

In addition, it is possible for the individual himself/herself to perform whether or not the core data is linked. In addition, basically, since the pieces of the core data of the business entity in which the same encrypting method (and password) is set, by appropriately setting the encrypting method (and password), it is possible to determine whether certain core data is linked to certain core data. In addition, since the business entity can notify individuals on the encryption setting screen that they can receive more returning as the provision of third party of much core data is allowed, it is possible for the individual to urge the provision of the core data to the third party.

In addition, since the business entity itself holds the core data, it is possible to safely ask the broker to mediate data sales. In addition, since the core data is not provided to the broker, even in a case where there is a suspicion about the reliability of the broker, it is possible to ask the broker to mediate the data sales.

As described above, it is possible to expect the increase of data provision from the individual and the business entity. In addition, since the buyer does not perform an analysis performed so far or the like, it is also possible to expect the increase of data demand.

Although the embodiment discussed herein is described above, the embodiment is not limited thereto. For example, the functional block configuration of the broker device 1 described above and the business entity devices 3*a* and 3*b* may not match an actual program module configuration.

In addition, the configuration of each table described above is an example, and it does not have to be the above-described configuration. Furthermore, even in a process flow, it is also possible to change the order of processing as long as a process result does not change. Furthermore, it may be performed in parallel.

In the above-described example, the business entity devices 3*a* and 3*b* hold the core data, but the broker device 1 may hold the core data. In this case, the broker device 1 transmits the core data to which the temporary ID is linked to the buyer devices 5*a* and 5*b*.

In addition, confirmation for setting the encryption may be performed in writing with respect to each of the individuals.

Figure 21:
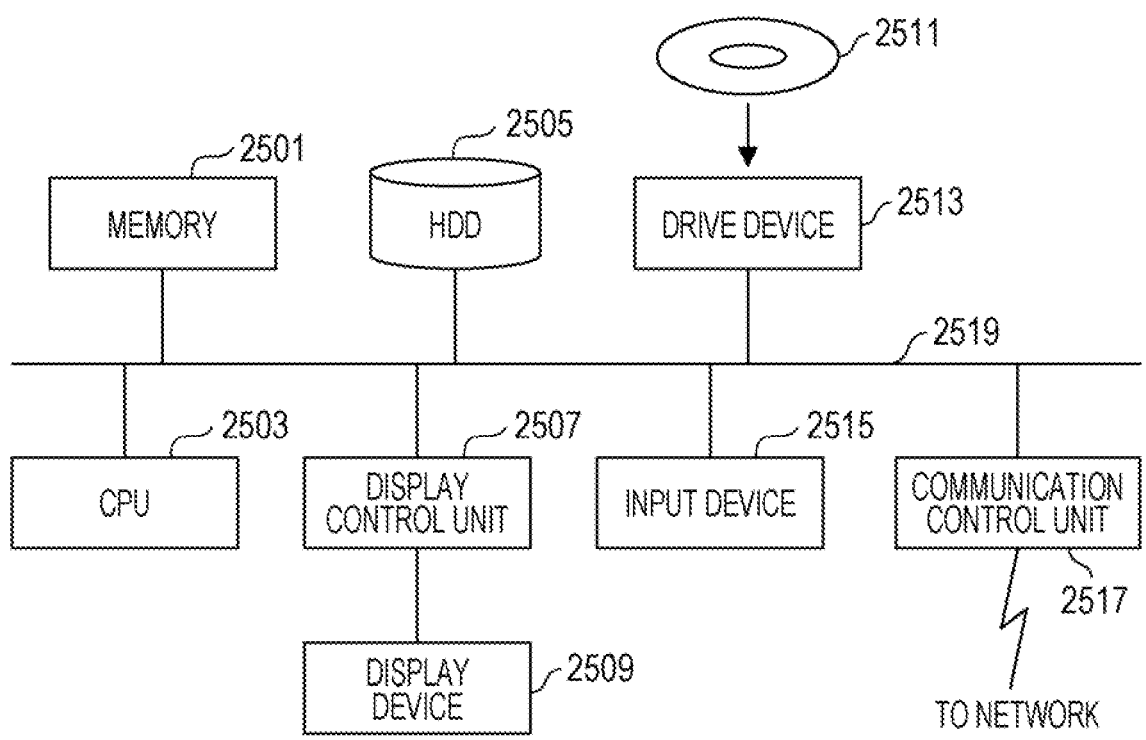
FIG. 21 is a functional block diagram of a computer.

The broker device 1, the business entity devices 3*a* and 3*b*, the buyer devices 5*a* and 5*b*, and the user devices 7*a* to 7*c* which are described above are computer devices, as described in FIG. 21, a memory 2501, a central processing unit (CPU) 2503, a hard disk drive (HDD) 2505, a display control unit 2507 connected to a display device 2509, a drive device 2513 for a removable disk 2511, and a communication control unit 2517 connected to an input device 2515 through a network are connected with each other through a bus 2519. An operating system (OS) and an application program for performing a process in this example are stored in the HDD 2505, and read in the memory 2501 from the HDD 2505 when performed by the CPU 2503. The CPU 2503 causes a predetermined operation by controlling the display control unit 2507, the communication control unit 2517, and the drive device 2513 in response to process content of the application program. In addition, the data in processing is mainly stored in the memory 2501, and may be stored in the HDD 2505. In the example of the embodiment, the application program for performing the above-described process is stored in a computer readable removable disk 2511 and distributed, and is installed in the HDD 2505 from the drive device 2513. There is a case where the application program may be installed in the HDD 2505 via a network such as the Internet and the communication control unit 2517. Such a computer device realizes various functions as described above by organically cooperating hardware such as the CPU 2503, the memory 2501 and the programs such as the OS and the application program.

The above-described embodiment is summarized as follows.

A personal data providing system according to a first aspect of the embodiment includes (A) a plurality of the first information processing apparatuses (for example, business entity devices 3*a* and 3*b*). Then, each of the plurality of the first information processing apparatuses includes (a1) a first transmission unit (for example, inquiry unit 301) that transmits an inquiry for the encrypting method of an individual identifier to each individual terminal, and (a2) an encryption unit (for example, encryption unit 303) that generates each individual code by encrypting each individual identifier based on a response corresponding to the inquiry received from each the individual terminal, and corresponds the individual code to each of the personal data of the individual.

Since the individual can encrypt the identifier by designating the encrypting method and the password by himself/ herself, it is possible to realize the privacy protection according to the individual's wishes.

In addition, the personal data providing system may further include the second information processing apparatus. Then, the encryption unit (a21) transmits the code of each of the individuals to the second information processing apparatus, and the second information processing apparatus may include (b1) a first correspondence unit (for example, determination unit 103) that specifies the plurality of codes generated from the same individual identifier based on the code of the individual received from each of the plurality of the first information processing apparatuses, and corresponds a second identifier with respect to the plurality of the specified codes, and (b2) a second transmission unit (for example, temporary ID transmission unit 107) that transmits a code in which the second identifier and the second identifier corresponds each other to a designated first information processing apparatus that is the first information processing apparatus of a transmission source of the code. Then, the first information processing apparatus that receives the second identifier from the plurality of the first information processing apparatuses may further include (a3) a second correspondence unit (for example, core data transmission unit 309) that corresponds the personal data of the individual having the identifier corresponding to the code corresponding to the second identifier to the received second identifier.

It is possible to correspond a common second identifier between the plurality of the first information processing apparatuses to the personal data.

In addition, the personal data providing system may further include a third information processing apparatus. Then, the second correspondence unit may transmit (a31) the received second identifier and the personal data of the individual having the identifier corresponding to the code corresponding to the second identifier to the third information processing apparatus. Then, the third information processing apparatus may associate (c1) the personal data received from the plurality of the first information processing apparatuses based on the second identifier.

It is possible for the third party to associate the personal data between the plurality of the first information processing apparatuses.

In addition, the inquiry may be an inquiry for the encrypting method for each type of the personal data.

It is possible to respond more flexible with respect to the individual's wishes.

In addition, the inquiry may further include an inquiry for he password.

Furthermore, since the encryption can be performed by using the password, it is possible to realize stronger security.

In addition, the encrypting method may include a method using the cryptographic hash function.

An information processing apparatus of a second aspect of the embodiment includes (D) a transmission unit (for example, inquiry unit 301) that transmits the inquiry for the encrypting method of the individual identifier to a terminal of each of the individuals, and (E) an encryption unit (for example, encryption unit 303) that generates the code of each of the individuals by encrypting each individual identifier based on a response corresponding to the inquiry received from the terminal of each of the individuals, and corresponds the code of the individual to the personal data of each of the individuals.

An information processing apparatus according to a third aspect of the embodiment includes (F) a correspondence unit (for example, determination unit 103) that specifies the plurality of codes generated from the same individual identifier based on the code of each of the individuals received from each of the plurality of the first information processing apparatuses, and corresponds the identifier to the plurality of the specified codes, and (G) a transmission unit (for example, temporary ID transmission unit 107) that transmits the identifier and the code corresponding to the identifier to the designated first information processing apparatus that is the first information processing apparatus of a transmission source of the code.

A personal data providing method according to a fourth aspect of the embodiment is performed in a system including the plurality of the first information processing apparatuses. Then, each of the plurality of the first information processing apparatuses includes a process of (H) transmitting the inquiry for the encrypting method of the individual identifier to the terminal of each of the individuals, (I) generating the code of each of the individuals by encrypting each individual identifier based on a response to the inquiry received from the terminal of each of the individuals, and corresponding the code of the individual to the personal data of each of the individuals.

An information processing method according to a fifth aspect of the embodiment includes a process of (J) transmitting the inquiry for the encrypting method of the individual identifier to the terminal of each of the individuals, (K) generating the code of each of the individuals by encrypting each individual identifier received from the terminal of each of the individuals based on a response to the inquiry, generating the code of each of the individuals by encrypting each individual identifier, and corresponding the code of the individual to the personal data of each of the individuals.

An information processing method according to a sixth aspect of the embodiment includes a process of (L) specifying the plurality of codes generated from the same individual identifier based on the code of each of the individuals received from each of the plurality of the first information processing apparatuses, and corresponding the identifier to the plurality of the specified codes, and (M) transmitting the identifier and the code corresponding to the identifier to the designated first information processing apparatus that is the first information processing apparatus of the transmission source of the code.

It is possible to create a program for performing the process according to the above method in a processor. The program is stored in a computer-readable storage medium or a storage device such as a flexible disk, a CD-ROM, a magneto-optical disk, a semiconductor memory, and a hard disk drive. Intermediate processing results are temporarily stored in a storage device such as a main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A personal data providing system comprising:
a plurality of first information processing apparatuses and a second information apparatus, wherein each of the plurality of the first information processing apparatuses includes:
a first memory, and
a first processor coupled to the first memory and configured to execute a first process, the first process comprising:
transmitting an inquiry for an encrypting method of an individual identifier to a terminal, from among a plurality of terminals associated with a corresponding individual,
encrypting the individual identifier into a code based on a response to the inquiry received from the terminal,
corresponding the code to personal data of the corresponding individual, and
transmitting the code to the second information processing apparatus, wherein
the second information processing apparatus includes:
a second memory, and
a second processor coupled to the second memory and configured to execute a second process, the second process comprising:
specifying a plurality of codes encrypted from a same individual identifier from among a plurality of codes received from the plurality of the first information processing apparatuses,
corresponding a temporary identifier to the plurality of the specified codes, and
transmitting each of the specified codes and the temporary identifier corresponding to the specified codes to the first information processing apparatus designated as a transmission source of the specified codes,
wherein the first process further comprising:
receiving each of the specified codes and the temporary identifier from the second information processing apparatus, and
corresponding the received temporary identifier to the personal data of the individual having the identifier corresponding to the received each of the specified codes.

2. The personal data providing system according to claim 1, further comprising:
a third information processing apparatus,
wherein the first process further comprising:
transmitting the temporary identifier and the corresponding personal data to the third information processing apparatus, and
the third information processing apparatus includes:
a third memory, and
a third processor coupled to the third memory and configured to execute a third process, the third process comprising:
associating the personal data received from the plurality of the first information processing apparatuses based on the temporary identifier.

3. The personal data providing system according to claim 1,
wherein the inquiry is an inquiry for the encrypting method for each type of the personal data.

4. The personal data providing system according to claim 1,
wherein the inquiry further includes an inquiry for a password.

5. The personal data providing system according to claim 1,
wherein the encrypting method includes a method using a cryptographic hash function.

6. A personal data providing method for a system comprising a plurality of first information processing apparatuses and a second information processing apparatus, the method is executed by the plurality of first information processing apparatuses and the second information processing apparatus, the method comprising:
transmitting, with a first information processing apparatus, an inquiry for an encrypting method of an individual identifier to a terminal, from among a plurality of terminals associate with a corresponding individual,
encrypting, with the first information processing apparatus, the individual identifier into a code based on a response to the inquiry received from the terminal,
corresponding, with the first information processing apparatus, the code to personal data of the corresponding individual, and
transmitting, with the first information processing apparatus, the code to the second information processing apparatus,
specifying, with the second information processing apparatus, a plurality of codes encrypted from a same individual identifier from among a plurality of codes received from the plurality of the first information processing apparatuses,
corresponding, with the second information processing apparatus, a temporary identifier to the plurality of the specified codes, and
transmitting, with the second information processing apparatus, each of the specified codes and the temporary identifier corresponding to the specified codes to the first information processing apparatus designated as a transmission source of the specified codes,
receiving, with the first information processing apparatus, each of the specified codes and the temporary identifier from the second information processing apparatus, and
corresponding, with the first information processing apparatus, the received temporary identifier to the personal data of the individual having the identifier corresponding to the received each of the specified codes.

7. A non-transitory computer-readable medium storing a program for causing a computer to perform a process comprising:
transmitting, with a first information processing apparatus, an inquiry for an encrypting method of an individual identifier to a terminal, from among a plurality of terminals associate with a corresponding individual,
encrypting, with the first information processing apparatus, the individual identifier into a code based on a response to the inquiry received from the terminal,
corresponding, with the first information processing apparatus, the code to personal data of the corresponding individual, and
transmitting, with the first information processing apparatus, the code to a second information processing apparatus,
specifying, with the second information processing apparatus, a plurality of codes encrypted from a same individual identifier from among a plurality of codes received from a plurality of first information processing apparatuses,
corresponding, with the second information processing apparatus, a temporary identifier to the plurality of the specified codes, and
transmitting, with the second information processing apparatus, each of the specified codes and the temporary identifier corresponding to the specified codes to the first information processing apparatus designated as a transmission source of the specified codes, receiving, with the first information processing apparatus, each of the specified codes and the temporary identifier from the second information processing apparatus, and corresponding, with the first information processing apparatus, the received temporary identifier to the personal data of the individual having the identifier corresponding to the received each of the specified codes.

* * * * *